United States Patent [19]

Scarpetti

[11] Patent Number: 5,758,036
[45] Date of Patent: May 26, 1998

[54] PRODUCTION OF IMPROVED DIGITIZED STEREOSCOPIC POLARIZING IMAGES

[75] Inventor: Julius J. Scarpetti, Revere, Mass.

[73] Assignee: The Rowland Institute for Science, Cambridge, Mass.

[21] Appl. No.: 594,110

[22] Filed: Jan. 30, 1996

Related U.S. Application Data

[63] Continuation-in-part of Ser. No. 380,941, Jan. 31, 1995.

[51] Int. Cl.$^6$ .................................................. G06K 15/00
[52] U.S. Cl. ........................................ 395/105; 395/101
[58] Field of Search ........................... 395/101, 104, 395/106, 105, 117, 119, 125, 127; 359/465, 462; 347/433, 99, 100; 348/607–614

[56] References Cited

U.S. PATENT DOCUMENTS

| | | | |
|---|---|---|---|
| 2,184,999 | 12/1939 | Land et al. | 88/65 |
| 2,200,959 | 5/1940 | Land | 40/130 |
| 2,203,687 | 6/1940 | Land et al. | 88/16.6 |
| 2,204,604 | 6/1940 | Land | 95/5 |
| 2,281,101 | 4/1942 | Land | 88/29 |
| 2,289,714 | 7/1942 | Land | 88/16.4 |
| 2,289,715 | 7/1942 | Land | 88/29 |
| 2,298,058 | 10/1942 | Land | 88/65 |
| 2,298,059 | 10/1942 | Land | 88/65 |
| 2,299,906 | 10/1942 | Land | 95/8 |
| 2,315,373 | 3/1943 | Land | 88/29 |
| 2,329,543 | 9/1943 | Land | 88/65 |
| 2,346,766 | 4/1944 | Land | 88/65 |
| 2,348,912 | 5/1944 | Land | 88/65 |
| 2,356,250 | 8/1944 | Land | 88/65 |
| 2,373,035 | 4/1945 | Land | 88/65 |
| 2,397,149 | 3/1946 | Land | 88/65 |
| 2,397,272 | 3/1946 | Land | 88/65 |
| 2,397,276 | 3/1946 | Land | 88/65 |
| 2,402,166 | 6/1946 | Land | 88/65 |
| 2,423,503 | 7/1947 | Land et al. | 88/65 |
| 2,423,504 | 7/1947 | Land et al. | 88/65 |
| 2,440,102 | 4/1948 | Land | 88/65 |
| 2,493,200 | 1/1950 | Land | 88/112 |
| 2,788,707 | 4/1957 | Land | 88/24 |
| 2,811,893 | 11/1957 | Ryan | 88/29 |
| 4,975,772 | 12/1990 | Fujita | 348/607 |
| 5,146,415 | 9/1992 | Faris | 395/101 |
| 5,398,131 | 3/1995 | Hall et al. | 359/465 |

FOREIGN PATENT DOCUMENTS

| | | |
|---|---|---|
| 0 444 980 A2 | 9/1991 | European Pat. Off. |
| 0 587 164 A2 | 3/1994 | European Pat. Off. |
| 06 191084 | 7/1994 | Japan . |

OTHER PUBLICATIONS

International Search Report, Issued Jun. 7, 1996 during the prosecution of PCT/US96/01043.
Lee, F. (1989) "Overview of Thermal Ink Jet Technology" SPIE 1079; 342–349.
Walworth, V."Polarized Light Techniques for 3–D Display" IGC Conference. Three Dimensional Display Techniques (Monterey, CA) Jun. 9–11, 1985.

*Primary Examiner*—Arthur G. Evans
*Attorney, Agent, or Firm*—Thomas J. Engellenner; Mark A. Kurisko; Lahive & Cockfield, LLP

[57] ABSTRACT

This invention discloses a system for forming improved digitized stereoscopic polarizing images having reduced ghost images by utilizing digital imaging systems and ink jet printers. Stereoscopic polarizing images comprising a first polarizing sheet imprinted with a first image and a second polarizing sheets imprinted with a negative of the first image and a second image are stereoscopically aligned such that the negative of the first image reduces ghost images produced by the first image. The images in the first polarizing sheet and in the second polarizing sheet can be efficiently produced and modified using digital imaging systems and ink jet printer technology.

15 Claims, 5 Drawing Sheets

PRODUCTION OF IMPROVED DIGITIZED STEREOSCOPIC POLARIZING IMAGES

RELATED APPLICATIONS

This application is a continuation-in-part of the commonly-owned U.S. patent application Ser. No. 08/380,941, filed on Jan. 31, 1995.

BACKGROUND OF THE INVENTION

This invention relates to improved methods and apparatus for the production of improved digitized stereoscopic polarizing images, and in particular to new and useful digital data processing systems for manufacturing digitized stereoscopic polarizing images having reduced observable ghost images.

Ordinary (unpolarized) light is made of electromagnetic waves vibrating equally in all directions perpendicular to their direction of travel. Absorption-polarizing sheets polarize these light waves by partially or wholly absorbing the vectorial components vibrating in a specified direction transverse to the direction of travel.

A stereoscopic image based on the polarization of light is generally formed of a pair of polarizing images, each of which presents a light-polarizing design or image that selectively transmits light of a predetermined vector of polarization.

Stereoscopic image pairs, having a left-eye light-polarizing image superimposed on a right-eye light-polarizing image, enable the perception of a three-dimensional image when the image pair is viewed through a pair of polarizing filters, or analyzers, oriented to allow the left-eye polarized image to reach the left eye and the right-eye polarized image to reach the right eye. A polarizing image can be made by a sheet that polarizes light to different percentages, depending upon the density of the image at each point. In particular, the percentage of polarization is directly related to the image's density, nearly all light being polarized in high-density areas and only a small amount of light being polarized in low-density areas.

When forming the stereoscopic polarizing image, the most effective arrangement occurs when the polarization axis of the left-eye image is at right angles to the polarization axis of the right-eye image, and when the two layers are superimposed in such position with respect to each other that the images carried thereby are stereoscopically registered. An observer using viewing spectacles comprising orthogonal polarizing left-eye and right-eye lenses, then has each of his or her eyes receiving only the image intended for it, and the pair of images appears as a single three-dimensional image.

Various techniques exist for producing light-polarizing images on the light polarizing sheets. For example, in Land, U.S. Pat. No. 2,204,604, a light-polarizing sheet may initially be formed by a light polarizing material, such as an optically oriented suspension of minute crystals of herapathite or other polarizing material, in a suitable medium, such as cellulose acetate. A picture may then be reproduced on the light polarizing sheet by altering the polarizing characteristics of the sheet over pre-determined areas of the sheet, forming the negative of the desired image. The areas forming the design may be protected with a coating, such as wax, and the sheet subjected to a treatment that destroys or otherwise alters the polarizing characteristics of the exposed areas.

An alternative method for forming the stereoscopic print, as described in Land, U.S. Pat. No. 2,281,101, is to employ a Vectograph™ sheet material comprising a linear hydrophilic polymer, such as polyvinyl alcohol (hereinafter "PVA"), which has been treated such that its molecules are substantially oriented to be parallel to a specific axis. Orientation of polyvinyl alcohol generally can be accomplished by softening the PVA sheet, as for example by subjecting it to heat, or to the action of a softening agent, until the sheet may be stretched or extended, and then by stretching or extending until suitable orientation of the molecules has been obtained. In the case of polyvinyl alcohol for example, the sheet would generally be extended from two to four or five times its length. Once stretched, the PVA sheet is ready for lamination to a non-depolarizing base.

Further in accordance with Land, U.S. Pat. No. 2,281,101, polarizing images may be formed in PVA by printing thereon with certain dichroic, water-soluble, direct dyes of the azo type, or by staining the sheet with iodine in the presence of an iodide. The color of the dichroic image reproduced in this sheet may be controlled by selecting suitable dyes, stains or the like. The stain or dye is applied to the sheet from a halftone plate or a gelatin relief.

The term dichroism is used herein as meaning the property of differential absorption of the components of polarization of an incident beam of light, depending upon the vibration directions of the components. Dichroic dye or stain as used herein refers to a dye or stain whose molecules possess the property of becoming linearly disposed within the oriented sheet material. For example, when a molecularly-oriented polymeric sheet is dyed with a dichroic dye, the sheet will appear dichroic, i.e., it will absorb differently the vectorial components of polarization of an incident beam of light.

According to another method for forming polarizing images, disclosed in Land, U.S. Pat. No. 2,289,714, polarizing images in full color may be produced. In this process, the use of three subtractive dichroic dyes—a minus Red, a minus Green, and a minus Blue dye forming respectively the Cyan, Magenta, and Yellow images—allows the production of a full color image. To achieve full-color stereoscopic images, the Land '714 patent teaches that six well-registered gelatin relief images, a cyan pair, a magenta pair, and a yellow pair, must first be prepared; one relief for each color component in each of the two directions of polarization. Each of the six gelatin reliefs is then appropriately dyed, and an image from each relief is subsequently transferred to the appropriately oriented PVA layer.

One of the drawbacks of this method for producing full color stereoscopic images, as it is currently practiced, is the difficulty and time involved in transferring an image to the oriented polymer sheets. For example, to produce a full-color image with known methods requires transferring each color component of the image from a gelatin relief to the polymer sheet. Besides being time-consuming and expensive, this technique requires great precision in aligning each of the printed images to produce a clear and precise stereoscopic image. Another drawback with known techniques is the difficulty in masking the image. To alter the final three-color stereoscopic image even slightly, all six gelatin reliefs must be altered.

Masking is a term used to describe various methods for enhancing separation records, or original transparencies, in order to compensate for the unwanted absorptions of the subtractive dyes used in making a full color stereoscopic image. Conventional photographic negatives and positives are held in register with the original slide or the separations to provide improved highlights, cleaner colors, controlled contrast, improved shadow detail, and ultimately remove unwanted colors. These methods are described in great detail in "The Reproduction Of Colour" by R. W. G. Hunt and "Neblette's Handbook Of Photography and Reprography" edited by John M. Sturge.

Another drawback to stereoscopic images produced with polarizing sheets is the appearance of unwanted densities of ink in at least one of the polarizing sheets that give rise to observable ghost images. Ryan, U.S. Pat. No. 2,811,893, discloses a technique for controlling observable ghost images that is extremely labor intensive. The Ryan process involves adding to one of the pair of polarizing sheets a weak and light-polarizing negative image of the other light-polarizing image of said pair, and then registering the pair of polarizing sheets together. To form the pair of polarizing sheets, the methods disclosed in the Ryan patent require the production of six original filter separations, plus six masks for color correction, plus six anti-ghosting masks for total correction. This technique also necessitates the registration of the stereoscopic image from the eighteen layers identified above (i.e. six filters, six masks, and six color correctors). As a result, the Ryan process is expensive in terms of the talent and expertise required to maintain sharpness and registration throughout the process.

There is a need for a more efficient method of producing a stereoscopic image that combines the traditional advantages of the prior art while eliminating some of its disadvantages. Accordingly, an object of the invention is to provide an easier and more efficient method of producing full-color stereoscopic polarizing images having clearer and crisper images.

One object of the invention accordingly includes providing a system that efficiently and inexpensively reduces ghost images in a stereoscopic image.

It is also an object of this invention to provide methods, systems and materials that facilitate ink-jet printing of digitized stereoscopic polarizing images having reduced ghost images.

These and other objects will be apparent from the description that follows.

SUMMARY OF THE INVENTION

This invention, according to a principle aspect of the invention, accomplishes the objects of the invention by forming images on first and second polarizing sheets with an ink jet printer, and by stereoscopically aligning the imprinted second polarizing sheet with the first polarizing sheet so that the image on the second polarizing sheet reduces ghost images produced by the first polarizing sheet. In particular, the invention forms and applies to the second polarizing sheet an image consisting of a negative of the first image superimposed with a second image, such that when the first and second polarizing sheet are aligned the ghost image is substantially reduced by the negative of the first image. The methods involved in this invention utilize digital technology to quickly and easily form stereoscopic images having reduced ghosting artifacts.

In another aspect, the invention can match the negative image with the ghost image by adjusting the pixel density of the negative. More particularly, the invention can adjust the pixel density of the negative image so that the intensity of the negative image is substantially equal to the intensity of the ghost image. Such pixel density matching techniques further enhance the clarity of the digitized stereoscopic image by more effectively reducing ghost images.

A further aspect of the invention provides methods of modifying the pixel density of the second image so that the effects of the ghost image on the second image are substantially reduced.

Prior to this invention, the techniques used in eliminating ghost images were expensive, time-consuming, and often produced unsatisfactory results. This invention, through the use of digital technology and ink jet printing, provides for a system that allows individuals with out any particular expertise to easily manufacture improved digitized stereoscopic images having substantially no ghost images.

BRIEF DESCRIPTION OF THE DRAWINGS

For a fuller understanding of the nature and objects of the invention, reference should be made to the following detailed description and the accompanying drawings, in which.

DETAILED DESCRIPTION OF THE INVENTION

Figure 1:
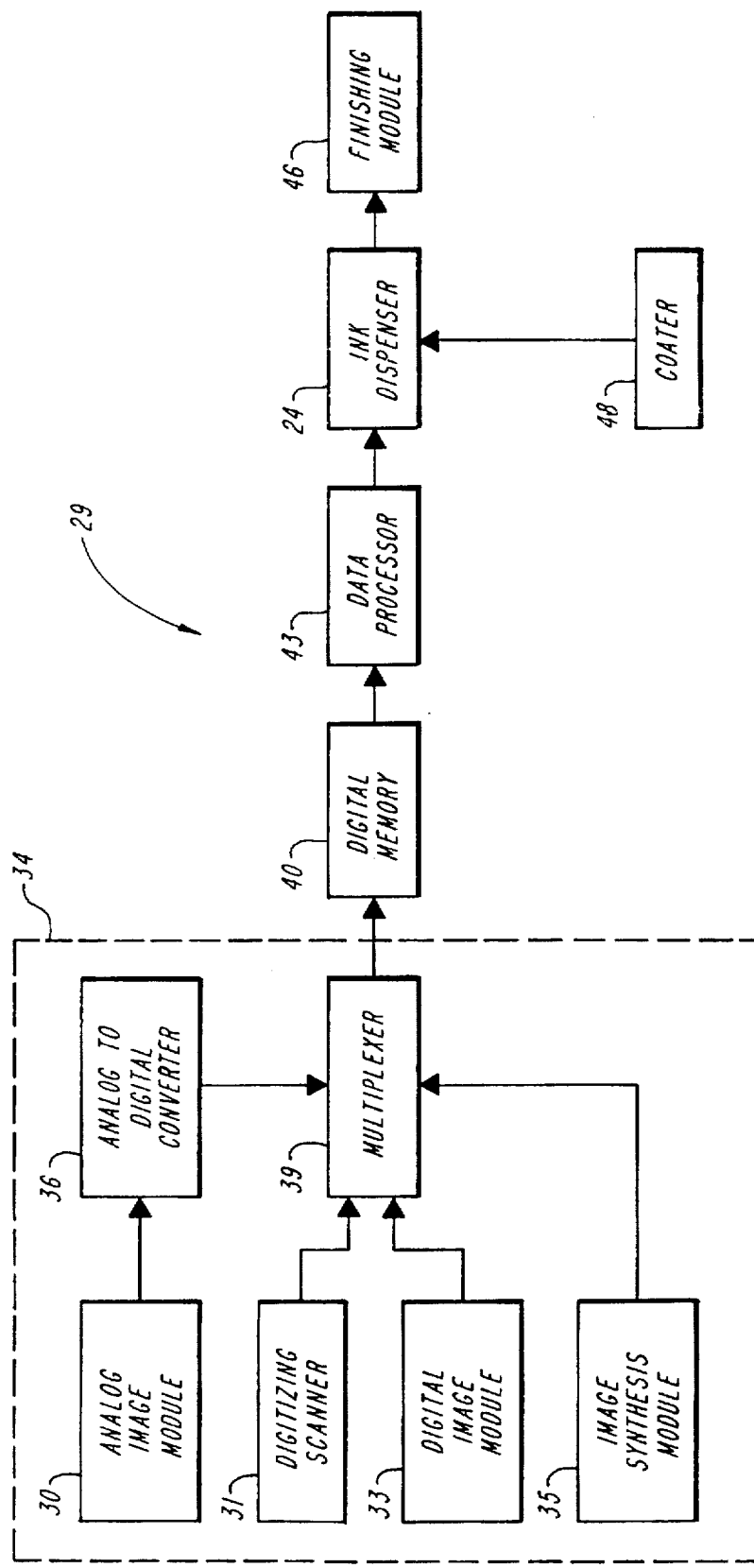
FIG. 1 shows a block diagram of a system for producing digitized stereoscopic polarizing images according to the invention.

Referring to FIGS. 1 through 5, wherein like reference numerals refer to like parts, there are illustrated various forms of polarizing sheets, light-polarizing images, and digitized stereoscopic polarizing images.

FIG. 1 illustrates an imaging system 29 for producing digitized stereoscopic polarizing images, comprising an input stage 34, a digital storage device 40, a data processor 43, an ink-dispenser 24, a coater 48, and a finishing module 46. Input stage 34 can include an analog image module 30, a digitizing scanner 31, a digital image module 33, an image synthesis module 35, an analog-to-digital converter 36, and a multiplexer 39.

Input block 34 is coupled to memory element 40 and supplies memory element 40 with digitized data used for creating a stereoscopic pair. Preferably, input block 34 supplies two digitized data files for each picture in question, one representing the right-eye image and the other representing the left-eye image of a stereoscopic pair. Input stage 34 can accommodate multiple paths for creating digital stereoscopic imaging data, including, but not limited to: an analog image input path; a digitizing scanner input path; a digital image input path; and an image synthesis path.

In the analog image input path of system 34 shown in FIG. 1, an analog image module 30 supplies an electronic analog signal representing a normal flat image for conversion to digital data by module 36. For example, image module 30 can be a standard video camera. Preferably, analog image module 30 supplies two images, one representing a left-eye image and the other representing the right-eye image. Left and right-eye images can be generated through stereoscopic cameras designed for this purpose and known in the prior art.

The input side of analog-to-digital converter 36 is electrically coupled to analog module 30, and the output side of converter 36 is electrically coupled to multiplexer 39. Converter 36 receives a stream of analog data from module 30 and changes the analog data to digital data. Converter 36 outputs to multiplexer 39 digital data representative of the analog data output by module 30.

In the digitizing scanner input path, digitizing scanner 31 generates digital signals representing the flat representations of images, including photographs, slides, and the like. Preferably, digitizing scanner 31 is supplied with two images, one representing a left-eye image and the other representing the right-eye image, for which it generates two separate digital signals. Digitizing scanner 31 can be, for example, a Hewlett Packard ScanJet™ Scanner, manufactured by the Hewlett-Packard Corporation of Palo Alto, Calif. Digitizing scanner 31 outputs, in digital format, a representation of the subject images to multiplexer 39.

In the digital image input path, digital image module 33 supplies a directly digitized image for conversion to a light polarizing image. Digital input module 33 may comprise, for example, a digital camera. In another embodiment, digital image module 33 may include a digital storage device, such as a CD ROM, or floppy disc containing a digital data file corresponding to an image. In addition, a pair of planar images that are right-eye and left-eye views may be produced in an image synthesis module 35 from seismic rotation cameras and CAD or CAM drawing programs.

Multiplexer, or selector, 39 connects either the signal generated by converter 36, digitizing scanner 31, digital image module 33, or image synthesis module 35 to digital memory 40. Alternatively, system 29 can exclude selector 39 and instead couple directly to digital memory 40 either converter 36, scanner 31, or digital image module 33. Digital memory 40 comprises a standard device for storing and retrieving digital signals, such as CD ROM, disc drives, tapes, magnetic memory devices, or random access memory. Digital memory 40 thus stores for later use data representing either a single image or a pair of left and right eye images for conversion into a stereoscopic pair of polarizing images.

Digital memory 40 is coupled to data processing apparatus 43. Data processing apparatus 43 includes an element for controlling ink-dispenser 24 and an element for processing digital data supplied by memory element 40.

Data processor 43 can include, for example, electronic apparatus capable of manipulating the data obtained from memory element 40 such that the image represented by the data can be flipped horizontally or vertically. The ability to flip the image represented by the data facilitates the stereoscopic registration of left and right eye images.

Data processor 43 can also include electronic apparatus that allows the data representing an image's pixel density to be manipulated in a manner that allows resizing compression or expansion of the image. Preferably, data processing apparatus 43 also contains structures for touching up the image and for enhancing the clarity or contrast of the image. The image clarity can be enhanced by modifying the brightness, intensity, or hue characteristics of particular pixels in the image. One enhancement technique involves combining the image with its mathematical derivative. The derivative of the image enhances the clarity of edges in the image. In one embodiment, data processor 43 can also be used to modify the content of images, i.e., to produce composite images or collages or to remove unwanted elements. In one embodiment, data processor 43 can be a general purpose computer running Adobe Photoshop™ software, manufactured by the Adobe Corporation of Arizona.

In a preferred embodiment of this invention, digital memory 40 contains data representing both the left and right eye images of a picture being converted to a digitized stereoscopic image. In an alternative embodiment, digital memory 40 contains a three-dimensional data set describing the three-dimensional geometry of an object or of a scene: a computer graphic model. Image processing apparatus 43 is used to render left and right members of a stereoscopic pair of images of the object or scene with computer graphic techniques well known in the art. For example, stereoscopic image pairs can be produced from the data generated by image synthesis module 35 by rendering a model once and then rendering again after a small angular rotation around the vertical axis running through the model, or, in the case of a scene, rendering an image and then, after a small displacement in the horizontal position of the viewpoint, making a second rendering. Such computer graphic techniques produce with computer graphic modeling and rendering the equivalent left and right perspectives produced by stereoscopic image capture.

Data processing apparatus 43 generally reduces or increases the pixel density of the digitized images stored in memory element 40 to a pixel density appropriate to the desired percentage of polarization. For example, a digitized image may contain approximately 2000 pixels per inch while a desirable density for the light polarizing image is around 300 pixels per inch. In one embodiment, data processor 43 can reduce the pixel density by replacing a group of two or more adjacent pixels with a single new pixel representing a weighted average of the characteristics of the replaced group of adjacent pixels. In another embodiment, processor 43 can increase pixel density by adding new pixels to the image between already existing pixels. The characteristics of the newly generated pixels are determined by interpolation between adjacent pixels already in the image.

Data processing apparatus 43 is electronically coupled to ink-dispenser 24. Ink-dispenser 24 can include various ink-jet printers known in the art, and other printers capable of spraying ink. Generally all functions of ink-dispenser 24 are slaved to control signals generated by data processor 43, except for the quantity of ink sprayed for each dot of ink.

Ink-dispenser 24 applies, under the control of processor 43, the left-eye image to a first polarizing layer and the right-eye image to a second polarizing layer. The first and second sheets with left and right-eye images, respectively, become light-polarizing images. When the left and right-eye images are oriented such that their polarizing axes are orthogonal to each other, when stereoscopically registered, they bring each other to full contrast. In one preferred embodiment, ink-dispenser 24 applies left and right eye images to polarized layers on opposite sides of a single sheet 2, as described more fully by FIG. 5. The sheet described by FIG. 5 can have stretched and oriented PVA laminated to both sides of a non-depolarizing base, with one side oriented at −45° and the other at +45°.

A coater 48 can also be coupled to ink dispenser 24. Coater 48 supplies polarizing sheets having an ink-permeable polymeric coating to printer 24. Alternatively, the coating process can be practiced during manufacturing of the sheets. The ink-permeable polymeric coatings aid in the imbibition of ink by the polarizing sheets, as further described below.

Following printing and imbibition of the inks by a polarizing layer, the sheet can be processed in finishing module 46. Finishing module 46 can comprise, either alone or in combination, a washer for cleaning the image-bearing sheets, a protector for applying protective coatings, and a laminator for affixing one polarizing sheet to another.

Finishing module 46 can contain a washing system when the exterior of the polarizing image contains a removable coating or some active component that needs to be removed prior to storage. One embodiment of the washer comprises wiping the polarizing image with a sponge containing an aqueous solution to remove water soluble matter, such as a coating as later described in this disclosure. A second embodiment involves immersing the polarizing image in a tray containing an aqueous solution and then rubbing the sheet gently with a sponge to remove any water soluble matter on the exterior of the sheet. A third embodiment comprises passing the polarizing image between rollers in contact with a strip sheet. After removal of any matter on the exterior of the polarizing image using a washing system, the sheet can be drained and squeegeed or placed on dry toweling and wiped gently dry with soft toweling or tissues. All of these washing systems can easily remove water soluble matter without damaging the polarized images.

Finishing module 46 can contain a protection system for applying protective layers to the polarizing image. For example, module 46 can apply a hardener, a protective polymeric coating, or a cross-linking agent to the exterior of the polarizing image. This hardener, protective polymer, or cross-linker protects the polarizing image over time from damage resulting from physical contact. Module 46 can also be used to apply a layer for protecting the polarizing image from the detrimental effects of ultraviolet radiation.

Following the optional washing or postcoating system 46 and any subsequent drying, left-eye and right-eye polarizing images are stereoscopically aligned and laminated back to back, if the left and right images were not applied to opposite sides of a single sheet originally. Two polarizing images can be stereoscopically aligned by ensuring that an identical point found in both images becomes the farthest point forward in the foreground of each individual polarizing image, and by superimposing the two polarizing images so that the farthest point forward in each image overlaps. The combination of two orthogonally polarized images as disclosed herein, produces a full color stereoscopic polarizing image when viewed through a pair of polarizing filters or glasses. An alternative embodiment is to print on a two sided light-polarizing sheet as described above.

Figure 2:
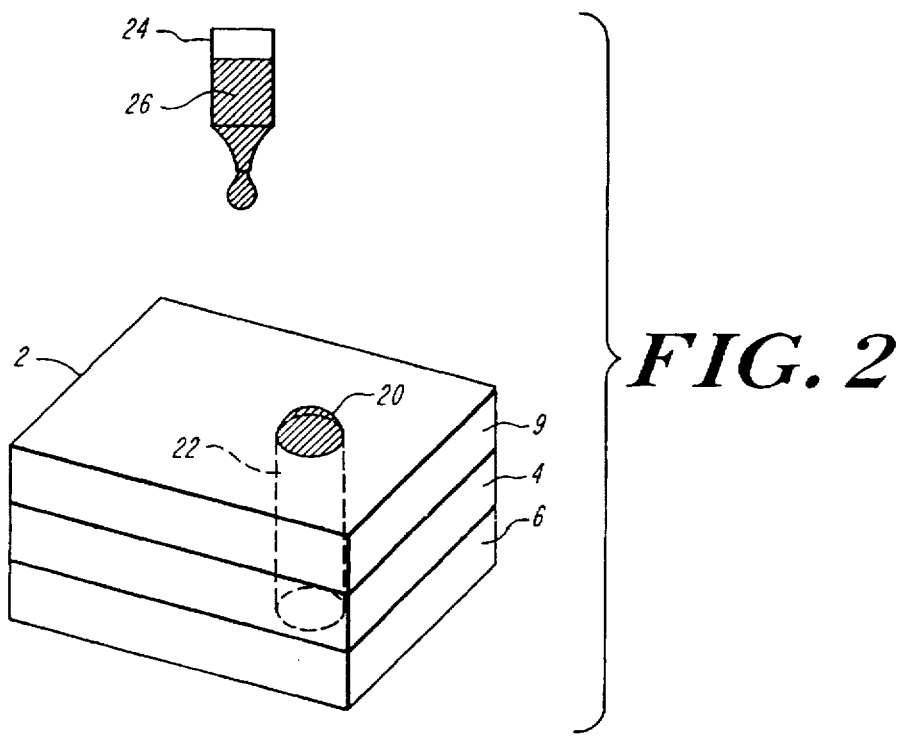
FIG. 2 shows a diagram of a polarizing sheet having a first coating according to the invention.

FIG. 2 illustrates a sheet 2 including a first coating 9 overlying a substrate 4. Substrate 4 can be carried on a backing 6. FIG. 1 also shows an ink dispenser 24 for applying various inks 26 to sheet 2. The inks are applied to the surface of coating 9 in individual dots forming ink pattern 20. Pattern 20 diffuses through coating 9 along an ink diffusion path 22 and is eventually imbibed by substrate 4.

Substrate 4 forms a sheet having a top and a bottom surface. The substrate transmits light and is composed of a substance that appears dichroic when dyed. Generally, substrate 4 can be formed of molecularly-oriented material, such as a stretched and oriented polymer, that allows alignment of dye molecules along parallel lines of substrate molecules. In addition, substrate 4 appears transparent prior to dyeing with ink 26, thus allowing the coloring of the image to be completely controlled by ink dispenser 24.

In one embodiment, substrate 4 is polyvinyl alcohol (hereinafter "PVA"), a long chain polymer that readily assumes a linear configuration upon heating and stretching and also absorbs dichroic stains or dyes. Sheets of PVA can be stretched and oriented according to various methods known in the art. Once stretched and oriented and dyed, the sheet of PVA exhibits properties of dichroism.

Substrate 4 holds a desired image or ink pattern 20 formed when ink 26 is imbibed by the layer comprising oriented molecules forming substrate 4. The pattern formed of printed dots of color, oriented along parallel lines of polymeric molecules, both transmit the image and polarize the light passing through substrate 4. The percentage polarization of light by substrate 4 is related to the density of the printed dots of color forming the desired image.

Base 6 abuts the bottom of substrate 4 and provides flexible support for substrate 4. Base 6 can comprise, for example, a non-depolarizing transparent polymer such as a cellulose acetate butyrate layer approximately 0.005 inches thick or cellulose triacetate layer approximately 0.003 inches thick. Light shined through the combination of substrate 4 and base 6 with the image of ink pattern 20 becomes polarized. These features prove useful when polarizing sheet 2 is used as a transparency or projection sheet.

Alternatively, two laminated images comprising a stereoscopic polarizing image or a single two-sided stereoscopic polarizing image may have a reflective layer mounted to the underside of this sheet containing the stereo image. The reflective layer can comprise, for example, paper coated with metal, a metal mirror, metal foil, or metal flakes suspended in plastic. The reflective layer reflects rays of light entering the top of substrate 4 and passing through base 6. The rays reflected back through base 6 and substrate 4 provide an image of ink pattern 20 to an observer.

Coating 9 overlies the top surface of substrate 4 and can be applied as a viscous fluid with a viscosity ranging from roughly 1000 to 1500 centipoise. The layer of viscous fluid, that dries to a clear film after approximately twenty-five minutes, maintains a coating thickness of substantially 0.02–0.03 micrometers. Coating 9 adheres to substrate 4 and ensures the uniformity of any subsequent coatings applied on top of coating 9.

According to this invention, coating 9 comprises a polymeric material. The polymeric material can be a natural or synthetic gum, a natural or synthetic thickener, or a natural or synthetic polymer, such as a cellulosic polymer. Examples of such cellulosic polymers include carboxymethyl cellulose (CMC) and hydroxyethyl cellulose (HEC). For example, the coating 9 can consist of a thin layer of xanthan gum. In an alternative embodiment, coating 9 can comprise a polymeric material in a solution, such as a solution of xanthan gum in deionized water.

Coating 9 is permeable to ink 26, but is not readily dyed or stained by the ink. Coating 9 serves the purpose of holding ink pattern 20 in situ for a period of time which ink pattern 20 remains wet to the touch, but is held in its place as though it were dry. Over time, the ink migrates downward through coating 9 along ink diffusion path 22, rather than laterally across the top surface of coating 9. This allows the direct transfer of ink pattern 20 to the surface of substrate 4 at a controlled rate with substantially no change in the image formed by ink pattern 20, thereby allowing ink 26 to be imbibed by substrate 4 with substantially no lateral diffusion, smearing, or spreading. Coating 9, therefore, holds ink 26 and regulates and/or facilitates the transfer rate of ink 26 into substrate 4.

Figure 3:
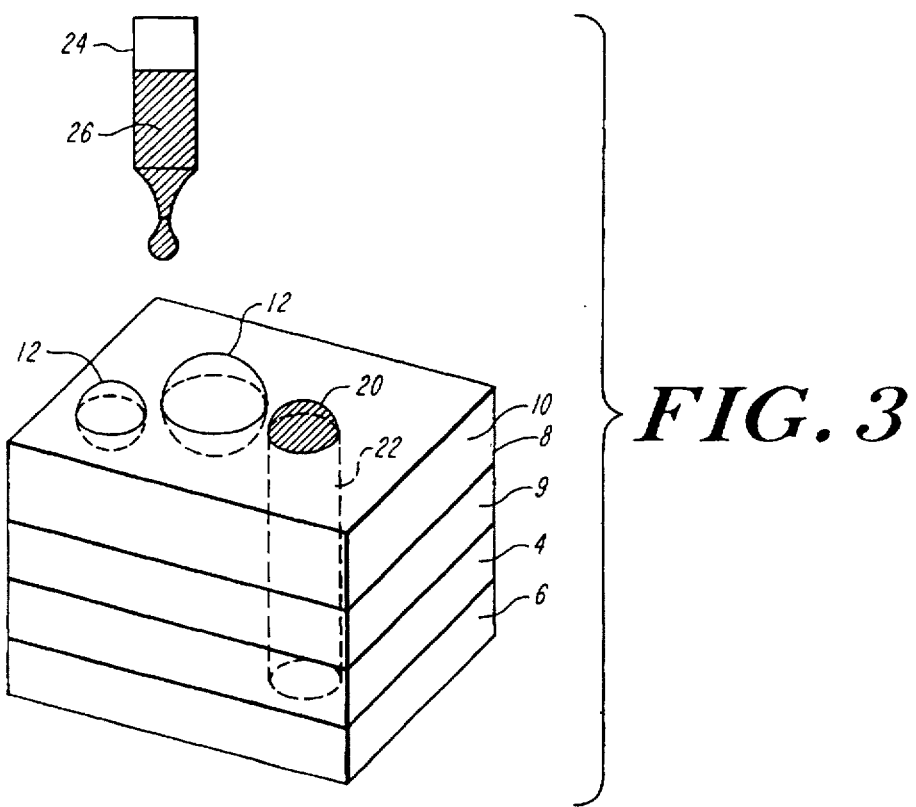
FIG. 3 shows a diagram of a polarizing sheet having a first and a second coating according to the invention.

FIG. 3 illustrates an alternative embodiment of sheet 2 having a second coating 8 extending over first coating 9, that in turn overlies substrate 4. Coating 8 may comprise either a polymeric material 10, or polymeric material 10 in combination with a particulate material 12. In addition, substrate 4 is laminated to backing 6.

Coating 8 overlies coating 9 and is applied after coating 9 has sufficiently dried. Coating 8 is applied as a viscous fluid having, for example, a viscosity ranging from about 5000 to 6000 centipoise. After approximately twenty-five minutes, the viscous fluid coagulates and forms a semi-solid layer having a height of approximately 0.1 micrometers.

Coating 8 can be a natural or synthetic gum, a natural or synthetic thickener, a natural or synthetic polymer (e.g. CMC, HEC, or other thickeners), or a combination of natural and synthetic polymeric materials. For example, the polymeric material of coating 8 can include gums, such as xanthan gum. Alternatively, coating 8 can comprise a polymeric material in a solution, such as deionized water.

Both coating 8 and coating 9, either alone or in combination, advantageously hold ink pattern 20 in situ and enable the downward migration of ink 26 along ink diffusion path 22, rather than laterally through the coatings. This allows the direct transfer of ink pattern 20 to the surface of substrate 4 at a controlled rate thereby allowing ink 26 to be imbibed by substrate 4 with substantially no lateral diffusion, smearing, or spreading. Coatings 8 and 9, therefore, hold ink 26 and regulate and/or facilitate the transfer rate of ink 26 into substrate 4.

In the illustrated embodiment, coating 8 contains a particulate 12, for example HPLC grade silica or colloidal silica, that inhibits lateral diffusion of dye molecules the polymeric material forming the coating. One such coating formed according to this invention is a compound formed of xanthan gum and silica. In general, particulates 12 each range from about 15 to 20 micrometers in diameter.

The ratio of dye permeable, or polymeric material 10, to particulate 12 contained in coating 8 may be varied in order to effect the migration of ink from the top of coating 8 to the bottom of coating 8 and to limit the migration laterally across coating 8. As the ratio of particulate to dye permeable material rises less lateral migration occurs, and as the ratio of particulate to dye permeable material falls more lateral migration occurs. The ratio is modified according to various factors, including: the composition of ink 26, the thickness of coating 9, the thickness of coating 8, and the characteristics of ink dispenser 24 and ink 26. Generally, when particulates are incorporated into the coating, such particulates will range from about 0.35 to about 0.75 percent (by weight) of coating 8.

With reference to FIG. 2 and FIG. 3, coated sheets not printed on within 24 hours can be prevented from drying out, in order that the coatings retain their properties. This may be prevented by wrapping sheet 2 in plastic within an hour after the coatings 8 and 9 have become solidified but retain moisture. Alternatively, sheet 2 can be overcoated with a strippable polymeric film coat to prevent excessive drying. A polymeric film coat applied within 24 hours retains the moisture in the coatings and can be easily removed prior to applying ink 26.

After ink 26 has been applied to sheet 2, it is allowed to dry. The drying time may be quite rapid or take one minute or longer. Various factors will influence the drying time, including the surface tension of ink 26, ink flow resulting from the various characteristics of ink dispenser 24, the thickness of coatings 8 and 9, and the density of ink pattern 20.

The first coating 9 and the second coating 8 may both contain a fungicide to hinder the growth of various microorganisms and mold. The fungicide kills microorganisms and mold known to feed on polymeric material, thus preventing the same organisms from damaging and potentially destroying coating 8 or coating 9.

In addition, coatings 8 and 9 can form temporary or permanent layers. If temporary, the coatings are generally water soluble to allow easy removal of the coatings. If permanent, the coatings typically are not water soluble or are subsequently overcoated to render the coatings 8 and/or 9 impervious to water damage. Furthermore, the permanent coatings should be transparent and have no significant capability of being dyed as a result of contact with the ink, in order to allow unobstructed viewing of the image or pattern created in substrate 4.

Figure 4:
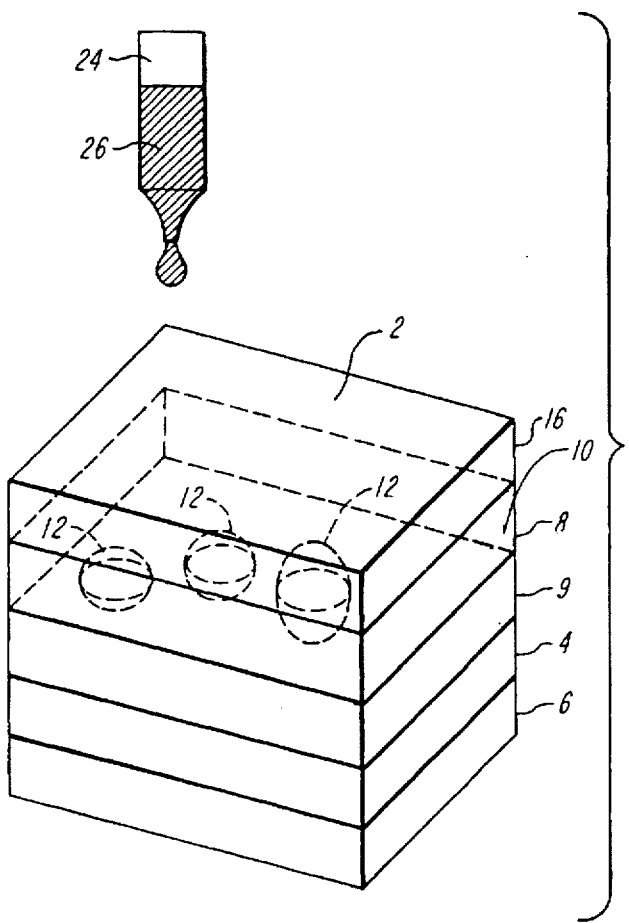
FIG. 4 shows a cross-sectional diagram of a polarizing sheet having a protective layer according to the invention.

FIG. 4 illustrates a sheet 2 according to this invention with permanent coatings 8 and 9 and a protective layer 16 applied after ink 26 has been imbibed by substrate 4 and allowed to dry. Protective layer 16 is formed by treating the top surface of coatings 8 or 9 with a hardener or cross linker designed to alter the polymeric material, thereby rendering coatings 8 or 9 less water-soluble and more durable. In one embodiment, protective layer 16 can be water resistant, and scratch and abrasion resistant, thus preventing marks and indentations that would alter an observer's view of an image in substrate 4. According to another aspect of this invention, protective layer 16 can be designed to absorb ultraviolet radiation in order to retard the fading of the images over time.

Inks 26, in accordance with the invention, can be formulated to permit rapid start-up in a printing head, provide smooth transfer during the spraying involved in ink-jet printing operations, and exhibit controlled drying on substrate 4 and coatings 8 and 9. Inks 26 comprise a de-salted dichroic dye, and a mixture of deionized water and polyhydric alcohol in appropriate proportions to ensure controlled flowing and drying. One preferred polyhydric alcohol is diethylene glycol. In formulating ink 26, the water to polyhydric alcohol ratio varies as a function of the type of ink dispenser being used. For example, in the case of the low end ink-jet printers (i.e. those without heaters) the ink composition can contain 85–90% water and correspondingly 15–10% polyhydric alcohol; and in the case of high end ink-jet printers (i.e. those with heaters) the ink compound can contain 90–95% water and correspondingly 10–5% polyhydric alcohol.

Ink 26 can farther include a complexing agent, such as Ethylenediaminetetraacetate (hereinafter "EDTA"), or a preservative, such as dehydrosodium acetate. Complexing agents can be added to ink 26 to complex metals. Complexing agents, such as EDTA, can be obtained from Sigma Chemical Company of Saint Louis, Mo. Alternatively, ink 26 may include both the complexing agent and the preservative. The complexing agent and the preservative combined account for no more than 0.2% (by weight) of the ink compound. The inks 26 used in printing, according to this invention, contain a water-soluble, salt-free, direct dye of the azo type. The dyes chosen possess the property of dichroism, when properly oriented on substrate 4. De-salting the dyes used in the inks are accomplished using standard desalting methods such as dialysis, reverse phase chromatography, high-pressure liquid chromatography, reverse osmosis, and ultrafiltration.

One specific assortment of dyes useful for R,G,B printing is Cyan, Magenta and Yellow (minus Red, minus Green, minus Blue). The Cyan dye comprises a direct Green #27 at 2.0% concentration, the Magenta dye comprises a combination of 30% Direct Red #117 and 70% Sands Violet #9 at a total concentration of 1.0%, and the Yellow dye comprises a Primula Yellow from Hodagaya at 2.0% concentration. The particular grouping of dyes currently used for C, M, Y, K printing are Cyan, Magenta, Yellow, and Black. The Cyan, Magenta, and Yellows dyes are formed as disclosed above, and the Black dye comprises a Direct Black #170 at 3.0% concentration.

Images can be transferred to sheet 2 using an ink-dispenser 24 consisting of gelatin relief images, as disclosed in the prior art. However, more advanced systems for transferring images to sheet 2 and for generating stereoscopic polarizing images can be utilized in accordance with this invention.

Figure 5:
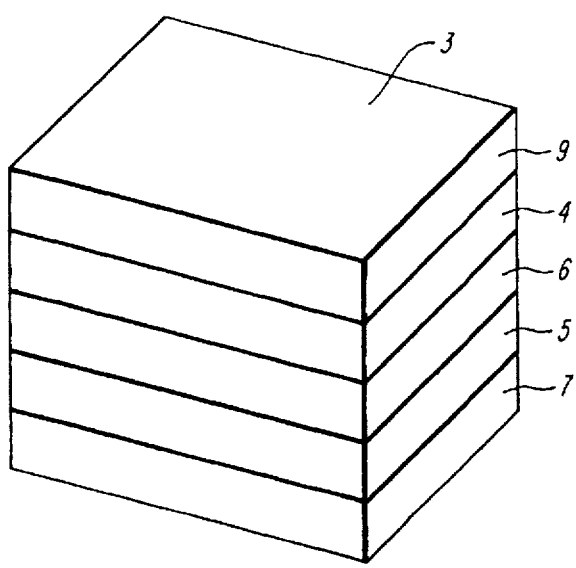
FIG. 5 shows a cross-sectional diagram of a multilayer sheet capable of forming a pair of polarizing images according to the invention.

FIG. 5 shows a preferred stereoscopic polarizing image 3 having a 0.003 inch thick triacetate base 6, a first molecularly-oriented substrate 4 laminated to the top surface of base 6, and a second molecularly-oriented substrate 5 laminated to the bottom surface of base 6. Substrates 4 and 5 are oriented such that their respective molecular orientations are at opposing 45 degree angles to the running edge of base sheet 6 and at 90 degrees to each other. Coating 9 (as described herein) is mounted to the top of substrate 4, and a second coating 7 is mounted to the bottom of substrate 5. The combination of substrates 4 and 5, coatings 7 and 9, and base 6 result in a multilayer structure approximately 0.004 inches thick. This combination is thin enough to fit well within the tolerances of standard ink-jet printers.

In accordance with this invention, coating 9 is applied to the top surface of substrate 4 and a second coating 7 is applied to the bottom surface of substrate 5. After the coatings have dried, sheet 3 is then coated with a strippable polymer coat to prevent excessive drying of coatings 7 and 9. At that point, sheet 3 can be slit and cut into units of suitable sizes for printing. embodiment advantageously allows printing of a desired image or pattern to both sides of single sheet 3, thus removing any alignment problems when forming a stereoscopic polarizing image. Accordingly, sheet 3 is inserted into ink-dispenser 24 for application of a first image. After drying, sheet 3 is then flipped and re-inserted into ink-dispenser 24 for application of a second image. This system forms a complete stereoscopic polarizing image having two differently polarized images laminated together without having to physically align and superimpose separately produced polarizing images.

Figure 6:
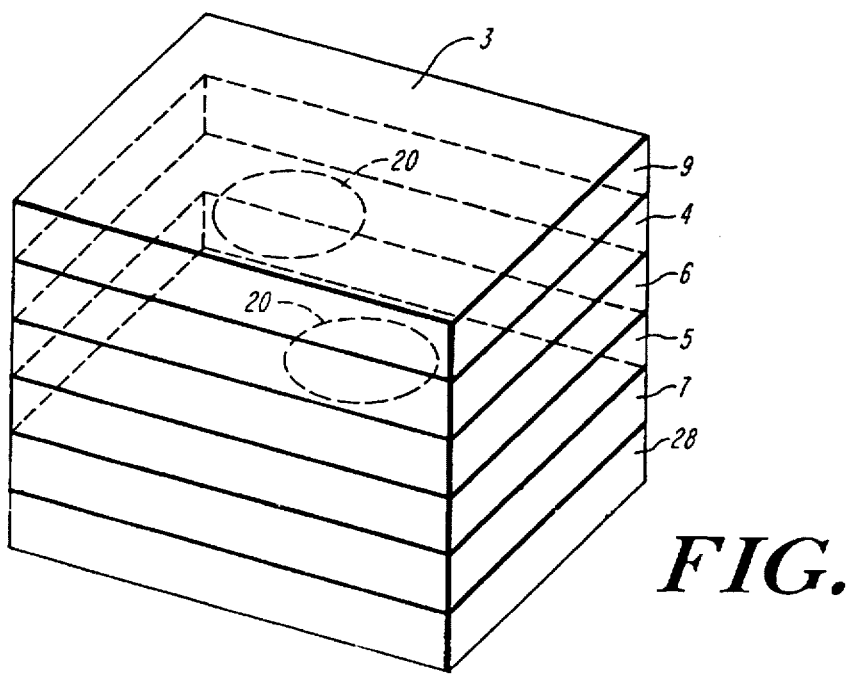
FIG. 6 shows a multi-layer sheet having a reflective layer.

FIG. 6 illustrates a stereoscopic polarizing image 3 with a reflective layer 28 mounted to the bottom surface of stereoscopic polarizing image 3. Reflective layer 28 reflects rays of light entering the top of image 3 back through image 3 to provide an image of ink pattern 20 to an observer.

Ink-jet printing methods and systems in accordance with this invention greatly simplify the preparation of full-color stereoscopic polarizing images. Ink-jet printers, unlike imbibition transfer apparatus, are compatible with digital imaging and can be used to provide stereoscopic reflective or transparent polarizing images from computer-generated or digitally-processed images, as well as from conventional photographic images that may have been digitized. Stereoscopic light polarizing images produced according to the techniques disclosed in this invention may be produced without the knowledge and use of photographic chemistry, as required with prior techniques. Stereoscopic prints produced in this manner have the added advantage of being easily and inexpensively modifiable. By simply altering the picture in the computer or digital imager, the stereoscopic image may be reprinted in its modified form. In addition, because ink-jet printers simultaneously print multiple colors aligned according to the digitized image, the problems in the prior art associated with aligning six gelatin reliefs are overcome. This invention easily and inexpensively produces a hard copy that provides three-dimensional images representing true spatial dimensionality.

Figure 7:
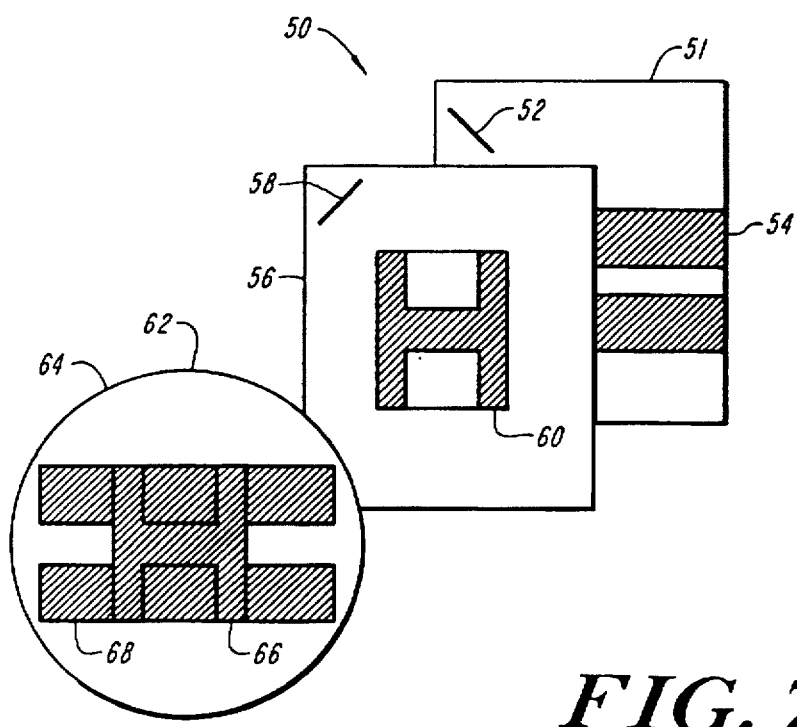
FIG. 7 shows a pair of polarizing sheets and an observable image.
Figure 8:
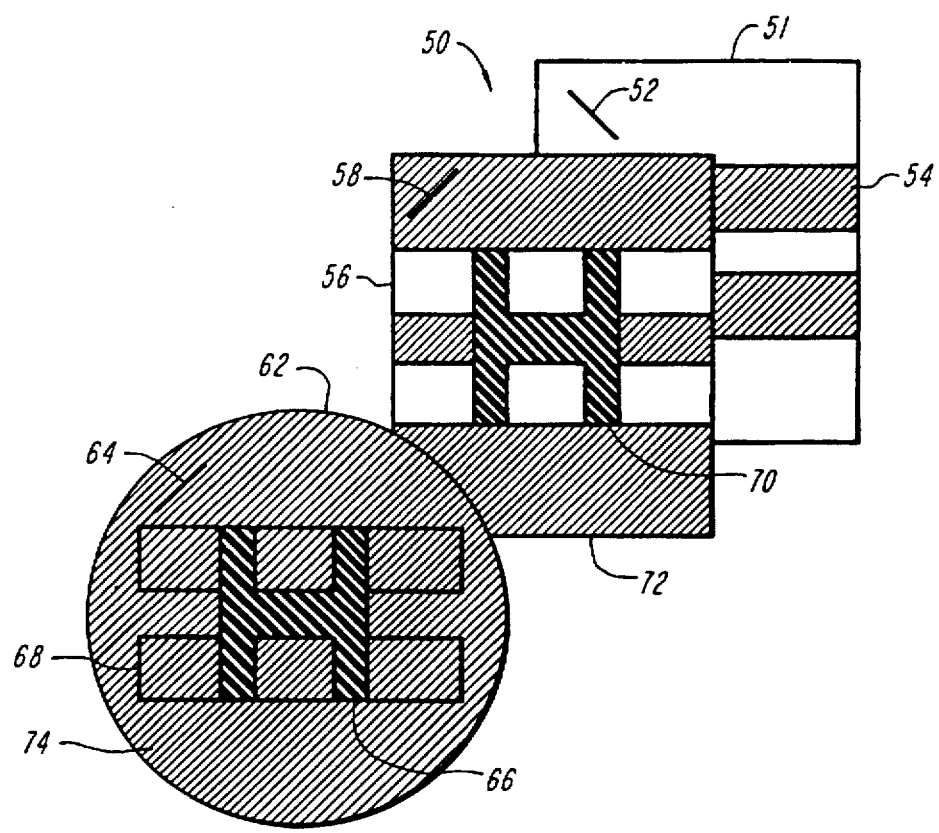
FIG. 8 shows a pair of modified polarizing sheets and an improved observable image.

FIGS. 7 and 8 show further aspects of this invention concerned with the elimination of ghost images which at times can become objectionably apparent to an observer viewing digitized stereoscopic polarizing images and projections thereof. In particular, FIG. 7 illustrates a digitized stereoscopic polarizing image 50 producing a desired image 66 along with a ghost image 68 on a polarizing filter 62, and FIG. 8 illustrates a digitized stereoscopic polarizing image 50 forming the desired image 66 with a reduced ghost image 68 on a polarizing filter 62.

Stereoscopic polarizing image 50 contains a first polarizing sheet 51 and a second polarizing sheet 56. The first polarizing sheet 51 is formed so that it can transmit light polarized along the direction of axis 52, and the second polarizing sheet 56 is formed so that it can transmit light polarized along the direction of axis 58. The degree to which the first and second polarizing sheets transmit polarized light depends upon the density of the image throughout the polarizing sheets. For example, areas of a polarizing sheet having a low pixel density will have a low polarizing efficiency, and areas of a polarizing sheet having a high pixel density will have a high polarizing efficiency.

If an ideal light polarizing sheet of the nature of sheets 51 and 56 were to be observed through an analyzer whose transmission axis is parallel to that of the polarizing axis, the density would be zero. If the analyzer through which this ideal polarizing sheet is viewed were rotated 90°, the density along the axis would be infinite. However, actual polarizing sheets differ from this theoretical ideal.

In actual polarizing sheets, the unwanted light absorption or density in a first image 54 may make that first image observable through the analyzer 64, even though analyzer 64 is intended for viewing only a second image 60. When this degree of imperfection is sufficiently great, ghost images which are observable by either or both eyes of an observer become objectionably apparent.

For example, with reference to FIG. 7, the first polarizing sheet 51 contains a first image 54, shown as two parallel bands, and the second polarizing sheet 56 contains a second image 60, shown as an "H" FIG. FIG. 7 additionally illustrates a polarizing filter 62 having a polarizing axis 64 oriented with respect to stereoscopic polarizing image 50, so that only images polarized along axis 58 can be viewed. When the degree of imperfection in sheet 51 is sufficiently great, image 54 can be transmitted through polarizing sheet 56 and be viewed through filter 62. These imperfections cause the viewer to observe a desired image 66 and a ghost image 68 through the filter 62.

In theory, when polarizing sheet 51 is formed of of oriented molecules of polymeric material dichroic ink is deposited with the same orientation, but in practice this does not always occur. When ink is not fully deposited with the same orientation the sheet 51 transmits an image 54 with non-polarized light. The non-polarized light that transmits image 54 is then viewed through analyzer 62 as the ghost image 68. When an edge of an area of relatively high density which is intended to be blocked from observation is in fact observable along an area of relatively low density of the image which is intended to be observed, the contrast becomes an objectionable ghost image. Under these conditions, it will be appreciated that objectionable ghost images will not be present under all conditions employing digitized stereoscopic polarizing images, and instead will be limited to particular scenes wherein a high density background of one image and a low density of the second image appear in overlapped relation.

As illustrated in FIG. 8, the ghost images may be reduced to a degree which can be tolerated, if not entirely eliminated, by building into either or the pair of light polarizing sheets 51, 56 a negative image of the other light polarizing stereoscopic image of said pair. For example, the second polarizing sheet 56 can contain a second image 70 and an image 72, such that image 72 is representative of a negative of the first image 54. The negative image 72 reduces the appearance of the ghost image 68 when the digitized stereoscopic polarizing image is viewed through polarizer 62.

Accordingly, this invention provides for a method of reducing the ghost image 68 by forming a first ink pattern representative of the image 70 superimposed with a negative image 72. This first ink pattern is applied with an ink-jet printer to the polarizing sheet 56, and the polarizing sheet 56 is then stereoscopically aligned with polarizing sheet 51 to form the digitized stereoscopic polarizing image 50, such that the negative image 72 reduces the ghost image 68 produced by light passing through polarizing sheet 51.

The first ink pattern, representative of image 70 superimposed with negative image 72, can be formed by using a microprocessor or computer employing a image manipulating tool, such as the Adobe Photoshop™ system manufactured by the Adobe Corporation of Arizona. For example, a data file representative of image 54 is stored in a memory element so that it can be easily manipulated and recovered at a later time. The digital representation of image 54 is retrieved from memory and inverted, thereby converting the digital representation into a negative image 72. The digital representations of image 70 and the negative image 72 are then merged together (e.g. by multiplying pixel values) to form a data file representative of image 70 superimposed with negative image 72.

In accordance with another aspect of this invention, the pixel density of negative image 72 is controlled so that a background image 74 produced by the negative image 72 is well matched with the ghost image 68 produced by the first image 54. Pixel density of image 72 is preferably regulated so that the intensity of the ghost image 68 viewed through filter 62 is substantially equal to the intensity of the background image 74 viewed through filter 62. This control advantageously allows a complete elimination of the ghost image.

Preferably, the pixel density of the image is modified with the aid of a microprocessor or computer. In particular, a data file representative of the negative image 72 can be stored in a memory element and this data file can be manipulated so that the pixel density of the image is altered.

In accordance with a further aspect of the invention, the undesired condition resulting in the ghost image 68 may be substantially eliminated by increasing the density of the second image 70, i.e. the image intended to be observed through filter 62, in areas where the offensive overlapping becomes apparent. The system for producing the stereoscopic images increases the pixel density of the image 70 so that the image polarizes light to a greater degree and thus overpowers any objectionable overlapping ghost image and stands out in higher contrast relative to the background noise produced by ghost image 68 and background image 74. Additionally, the system can further increase the contrast between the desired image 66 and the background image 74 during the formation of the negative image 72. In particular, the data file representative of the negative image 72 can be manipulated so that the brightness and contrast of the pixels forming the negative image 72 are reduced relative to the desired image 66.

According to a further embodiment of this invention first image 54 and second image 70 are digitized and stored in a first memory element, and then the system manipulates the digitized images. In particular, the system can convert the first image 54 into a negative image 72 and store the data elsewhere within the first memory element. The negative image 72 is then multiplied with the second image 70 to form a first data set representing the combination of the second image with a negative first image. An ink-jet printer, also under control of the system, can apply a first ink pattern representative of the first image 54 to a first oriented polymeric sheet, and can apply a second ink pattern to a second oriented polymeric sheet. The second ink pattern is preferably dictated by the first data set, so that an image equivalent to the superposition of the second image 70 and the negative image 72 is formed on the second polymeric sheet. When stereoscopically aligned and viewed through the filter 62, the first and second polymeric sheets produce an image 66 and a substantially hidden ghost artifact 68.

It is to be understood that the process of superimposing the negative image 72 with the second image 70 on the second polarizing sheet 56 to remove the ghost produced by the first polarizing sheet 51 applies equally to removing any ghost image produced by the second polarizing sheet 56. In particular, a negative of the second image 70 can be superimposed with the first image 54 on the first polarizing sheet 51 to remove a ghost image produced by the second polarizing sheet 56. Preferably, a pair of polarizing sheets 51, 56 contain negative images representative of the image found on the other polarizing sheet of the pair. Accordingly, this reduces ghost images viewed through a pair of polarizing filters aligned to view the digitized stereoscopic polarizing image 50.

While the invention has been shown and described having reference to specific preferred embodiments, those skilled in the art will understand that variations in form and detail may be made without departing from the spirit and scope of the invention.

Having described the invention, what is claimed as new and secured by Letters Patent is:

1. A method for reducing a ghost image observed when light passes through a digitized stereoscopic polarizing image having a first polarizing sheet imprinted with a first image and having a second polarizing sheet, the method comprising the steps of:

forming a first ink pattern representative of a second image superimposed with a negative of the first image, applying the first ink pattern with an ink jet printer to the second polarizing sheet such that the second polarizing sheet is imprinted with the second image and the negative of the first image, and stereoscopically aligning the first polarizing sheet and the second polarizing sheet so that the ghost image produced by incompletely polarized light passing through the first polarizing sheet is reduced.

2. A method in accordance with claim 1 wherein said forming step further comprises adjusting the pixel density of the negative image such that the negative image is well matched with a ghost image produced by the first image.

3. A method in accordance with claim 2 wherein said forming step further comprises adjusting the pixel density of the negative image such that the intensity of the negative image substantially equals the intensity of the ghost image produced by the first image.

4. A method in accordance with claim 1 wherein said forming step further comprises increasing the pixel density of the second image so that the ghost image is substantially reduced.

5. A method in accordance with claim 4 wherein the pixel density of the second image is only adjusted in those areas where the ghost image and the second image overlap.

6. A method in accordance with claim 1 wherein said forming step further comprises reducing the brightness and contrast of the negative image.

7. A method in accordance with claim 1, further comprising the step of coating the second polarizing sheet with a viscous first layer prior to the applying step.

8. A method in accordance with claim 1, wherein the forming step further comprises:

generating a first digital data set representative of the negative of the first image and a second digital data set representative of the second image, forming a third digital data set representative of the superposition of the negative of the first image and the second image, and wherein the third digital data set is used to form the first ink pattern.

9. An apparatus for forming a digitized stereoscopic polarizing image with a reduced ghost image from a first image of an object and a second image of the object, the digitized stereoscopic polarizing image having a first polarizing sheet imprinted with the first image and having a second polarizing sheet, the apparatus comprising:

A) a digital memory element for storing and retrieving a first data set representative of the first image and a second data set representative of the second image, B) a data processing element coupled with the digital memory element, the data processing element comprising:

i) first processing means for forming a negative data set representative of the negative of the first image, ii) second processing means for forming an output data set representative of the negative of the first image superimposed with the second image C) printing means coupled with the data processing element for printing the output data set onto the second polarizing sheet such that the second polarizing sheet, when stereoscopically aligned with the first polarizing sheet, reduces the ghost image created by the incompletely polarized light passing through the first polarizing sheet.

10. An apparatus according to claim 9, wherein the printing means is an ink jet printer.

11. An apparatus according to claim 9, further comprising means for stereoscopically aligning a first polarizing sheet and a second polarizing sheet.

12. An apparatus according to claim 9, wherein the data processing element further comprises third processing means for adjusting the pixel density of the negative image.

13. An apparatus according to claim 9, wherein the data processing element further comprises fourth processing means for adjusting the pixel density of the second image.

14. An apparatus according to claim 13, further comprising fifth processing means for identifying where the first image and the second image overlap.

15. An apparatus according to claim 9, wherein the data processing element further comprises sixth processing means for modifying the brightness and contrast of the negative image.

* * * * *